United States Patent
Bozek et al.

(10) Patent No.: US 8,789,048 B2
(45) Date of Patent: *Jul. 22, 2014

(54) VIRTUAL MACHINE PLACEMENT TO IMPROVE MEMORY UTILIZATION

(75) Inventors: James J. Bozek, Bothell, WA (US); Nils Peter Joachim Hansson, Monroe, WA (US); Edward S. Suffern, Chapel Hill, NC (US); James L. Wooldridge, Fall City, WA (US)

(73) Assignee: International Business Machines Corporation, Armonk, NY (US)

( * ) Notice: Subject to any disclaimer, the term of this patent is extended or adjusted under 35 U.S.C. 154(b) by 79 days.

This patent is subject to a terminal disclaimer.

(21) Appl. No.: 13/541,480

(22) Filed: Jul. 3, 2012

(65) Prior Publication Data
US 2012/0272244 A1 Oct. 25, 2012

Related U.S. Application Data

(63) Continuation of application No. 13/073,132, filed on Mar. 28, 2011, now Pat. No. 8,490,091.

(51) Int. Cl.
*G06F 9/455* (2006.01)

(52) U.S. Cl.
USPC ............................................................ 718/1

(58) Field of Classification Search
None
See application file for complete search history.

(56) References Cited

U.S. PATENT DOCUMENTS

| 2006/0184937 A1* | 8/2006 | Abels et al. ................ 718/1 |
| 2007/0136721 A1 | 6/2007 | Dunshea et al. |
| 2008/0271017 A1 | 10/2008 | Herington |
| 2009/0204718 A1 | 8/2009 | Lawton et al. |
| 2010/0107159 A1* | 4/2010 | Radhakrishnan et al. ........ 718/1 |

* cited by examiner

*Primary Examiner* — Gregory A Kessler
(74) *Attorney, Agent, or Firm* — Katherine S. Brown; Jeffrey L. Streets

(57) ABSTRACT

Virtual machines having a high amount of identical memory pages are grouped under a common hypervisor to enable greater memory savings as the result of transparent page sharing. One method comprises analyzing the software image content of a plurality of virtual machines running on a plurality of hypervisors in a common migration domain, identifying two or more of the virtual machines having greater than a threshold amount of common memory pages, placing the two or more virtual machines under a common hypervisor, and sharing the common memory pages among the two or more virtual machines. Optionally, the identifying of two or more of the virtual machines may include identifying two or more of the virtual machines having the same software image content classifications; thereby, identifying images with a greater affinity for common memory pages.

14 Claims, 10 Drawing Sheets

| Physical server | Classification | Allocated VMs | Total memory usage | Remaining memory |
|---|---|---|---|---|
| #1 | ● 4GB | 1 | 4GB | 2 GB |
| | • 3GB | 2 | 6GB | |
| | · 2GB | 4 | 8GB | |
| #2 | ● 4GB | 2 | 8GB | 5 GB |
| | • 3GB | 1 | 3GB | |
| | · 2GB | 2 | 4GB | |
| #3 | ● 4GB | 1 | 4GB | 3 GB |
| | • 3GB | 3 | 9GB | |
| | · 2GB | 2 | 4GB | |

| Physical server | Classification | Allocated VMs | Total memory usage | Remaining memory |
|---|---|---|---|---|
| #1 | • 2GB | 12 | 15GB | 5 GB |
| #2 | ● 4GB | 6 | 18GB | 2 GB |
| #3 | • 3GB | 10 | 19GB | 1 GB |

VIRTUAL MACHINE PLACEMENT TO IMPROVE MEMORY UTILIZATION

CROSS-REFERENCE TO RELATED APPLICATIONS

This application is a continuation of co-pending U.S. patent application Ser. No. 13/073,132, filed on Mar. 28, 2011.

BACKGROUND

1. Field of the Invention

The present invention relates to the management of virtual machines. More specifically, the present invention relates to the placement of virtual machines among servers to improve memory utilization.

2. Background of the Related Art

In a cloud computing environment, a user is assigned a virtual machine somewhere in the computing cloud. The virtual machine provides the software operating system and has access to physical resources, such as input/output bandwidth, processing power and memory capacity, to support the user's application. Provisioning software manages and allocates virtual machines among the available computer nodes in the cloud. Because each virtual machine runs independent of other virtual machines, multiple operating system environments can co-exist on the same physical computer in complete isolation from each other.

BRIEF SUMMARY

One embodiment of the present invention provides a computer-implemented method, comprising analyzing the software image content of a plurality of virtual machines running on a plurality of hypervisors in a common migration domain, identifying two or more of the virtual machines having greater than a threshold amount of common memory pages, placing the two or more virtual machines under a common hypervisor, and sharing the common memory pages among the two or more virtual machines. Optionally, the identifying of two or more of the virtual machines having greater than a threshold amount of common memory pages, may include identifying two or more of the virtual machines having the same software image content classifications which thereby have a greater affinity for common memory pages.

DETAILED DESCRIPTION

Figure 1:
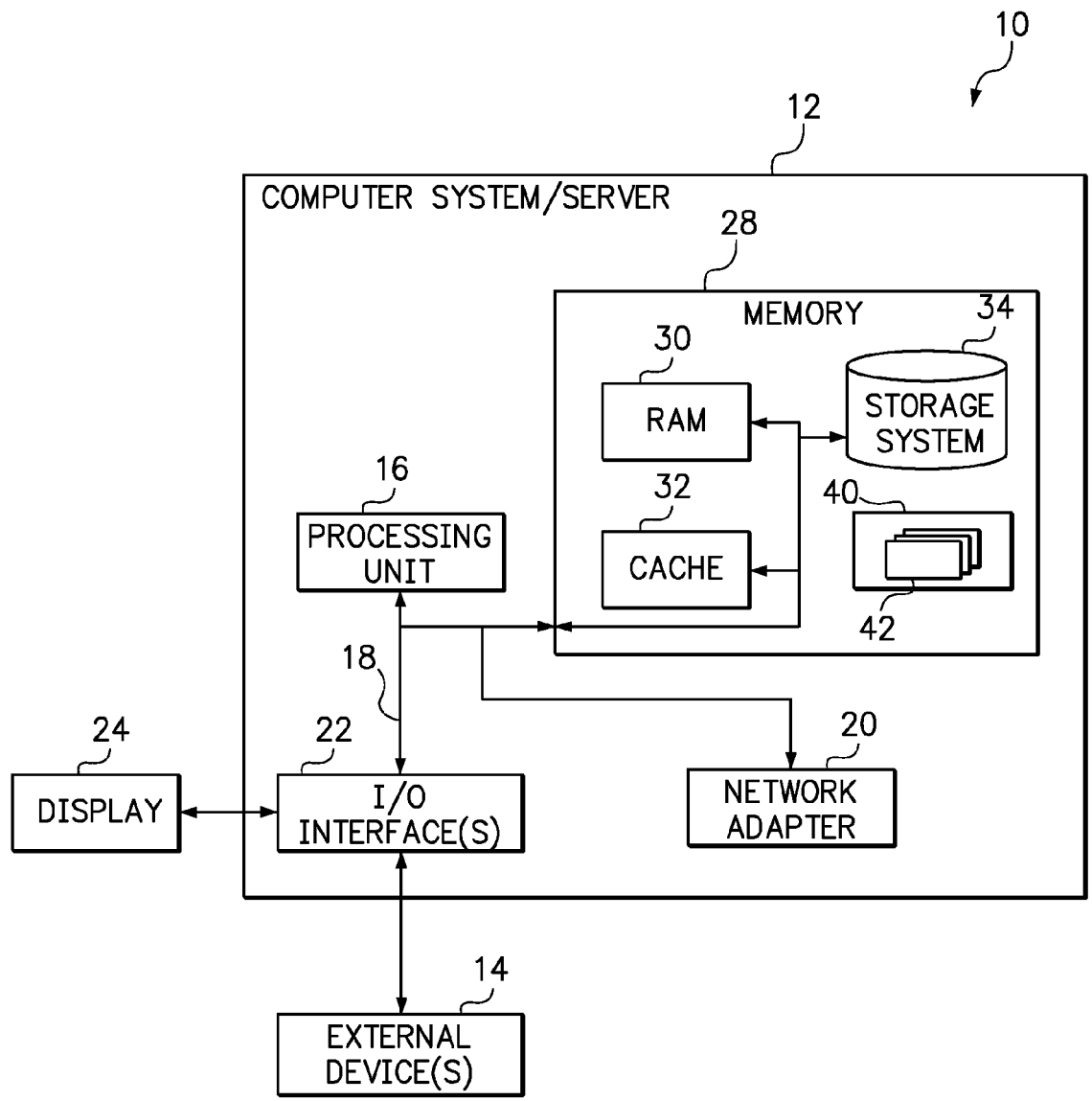
FIG. 1 is a diagram of a cloud computing node according to one or more embodiment of the present invention.

One embodiment of the present invention provides a computer-implemented method, comprising determining a software image content classification for each of a plurality of virtual machines, placing virtual machines with matching software image content classifications under a common hypervisor, and sharing identical memory pages among the virtual machines grouped under the common hypervisor. The term "common" is used herein to mean "shared by two or more entities." For example, the common hypervisor is shared by two or more virtual machines with matching software image content classifications.

According to the method, when two or more virtual machines operating under a common hypervisor have a memory page that is identical, the identical memory page(s) are shared. In one non-limiting example, the hypervisors may be x86 hypervisors having support for transparent page sharing. Transparent page sharing is the use of identical memory pages across guest virtual machines. Code pages, particularly those pages within the operating system, are well suited for this type of transparent sharing. One benefit of transparent page sharing is that it may lead to improved virtual machine density on servers. This benefit is particularly significant when the virtual machines running on the same physical server are fairly homogenous, as will be the case with virtual machines that are created from a common golden image with the same operating system. The improved virtual machine density comes from reducing the memory required to host guests that contain common images (software stacks). This improvement in memory management may allow more virtual machines to use the same physical server.

Placing virtual machines with matching software image content classifications under a common hypervisor may include the initial virtual machine placement, dynamic virtual machine migration or placement, or both. In a method of dynamic virtual machine placement, physical resources are scanned to determine if the virtual machines on a plurality of physical servers are optimally placed. For example, the method may determine whether one or more virtual machines have been dynamically deallocated or whether one or more new virtual machines have been allocated during run time. Furthermore, the method may move a currently running virtual machine to a different operating system or hypervisor as new operating systems or hypervisor upgrades become available. In one example, if a new operating system is installed, the Software Placement Organizer scans the VMs based on their image classification to see if they would run better on the new operating system. The method improves management of virtual machine cloud resources by implementing a Software Placement Organizer that executes a new server consolidation analysis algorithm.

The software image content of a plurality of virtual machines may optionally be classified on the basis of a common golden image used to create the virtual machine. Such virtual machines are expected to have a large amount of identical memory pages since they are created from the same image. For example, all virtual machines that are created from the common golden image will have the same operating system. Sharing identical operating system code pages across the virtual machines will alone result in significant memory savings. Furthermore, software image content classifications may be used to identify and facilitate grouping of similar application programs, such as CAD programs, database search engines, and spreadsheets, which have a greater affinity for common system code pages.

At startup of a new virtual machine, the new virtual machine may be placed on physical servers already running at least one virtual machine with an image stack that is similar in the sense that there are many identical memory pages. This method has particular affinity in cloud computing, where virtual machine images are created from a common repository. The common repository may have a set of golden master images that are not identical, but the virtual machines that are conceived from a common golden master image may be grouped together on a single physical server and a common hypervisor. This method allows additional virtual machines to be allocated on the same server because of the efficient use of common pages in memory across multiple similar guests. Likewise, as virtual machines are started and terminated depending on workloads, virtual machines with common image contents can be migrated dynamically to servers with virtual machines having an image content commonality. The common memory pages may include code pages, such as the code pages of an operating system.

The method may further include consolidating a standalone workload running on a first physical server to a second physical server running a hypervisor. For example, based on the software image content classification of a standalone workload, a Server Consolidation Assessment tool running on the global provisioning manager could move the standalone workload to a physical server that is running a hypervisor. The benefit of this move would be higher server consolidation ratios regardless of whether or not the hypervisor is implementing automated dynamic migration.

Another embodiment of the present invention provides a computer-implemented method, comprising analyzing the software image content of a plurality of virtual machines running on a plurality of hypervisors in a common migration domain, identifying two or more of the virtual machines having greater than a threshold amount of identical memory pages, placing the two or more virtual machines under a common hypervisor, and sharing the common memory pages among the two or more virtual machines. Optionally, the two or more virtual machines may be placed under a common hypervisors by dynamically migrating a first of the two or more virtual machines from a first physical server to a second physical server that is already running a second of the two or more virtual machines.

The amount of image ID occurrence between a first virtual machine and a second virtual machine may be increased, for example, by moving a workload of the first virtual machine from a first operating system to a second operating system that is used by the workload of the second virtual machine. In one embodiment, a software placement organizer (SPO) dynamically analyzes workloads that are either running in a virtual machine or on a physical server and determines the benefit of moving one or more identified workloads to a newer version of the operating system. Specifically, the software placement organizer may determine the amount of identical memory pages that two virtual machines could share if they had the same operating system, as compared to the current amount of identical memory pages between the two virtual machines. If there are significant potential memory savings resulting from changing the operating system, then the operating system may be changed automatically or an output may be generated to prompt a user to authorized and/or install the new operating system. An analysis tool could discover all running workloads and specifically looking for applications that are installed on different operating systems. The software could make OS upgrade suggestions and estimate the potential server utilization benefits. This would work for both workloads running on physical servers as well as within virtual machines. In one variation of the method, different versions of the same operating system may be considered to be different operating systems, since two virtual machines running the same version of the operating system will be able to share a greater amount of memory pages.

It should be recognized that the target physical server identified to receive an additional virtual machine or run a virtual machine with an upgraded operating system may be required to have additional attributes to satisfy additional aspects of a virtual machine management or migration policy. Such virtual machine management policies may assure that the migration results in a net benefit, rather than merely avoiding one limitation only to raise another. For example, it is expected that a virtual machine will only be migrated if the target physical server is further determined to have sufficient memory and CPU bandwidth available to run the virtual machine. Both of these attributes can be determined in the virtualization management space. In addition, the target physical server must be within the migration domain of the source physical server, and fit within all existing migration policies enabled by the management controller, such as security based dynamic migration policies and high availability migration sub-domains.

It should be understood that although this disclosure is applicable to cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
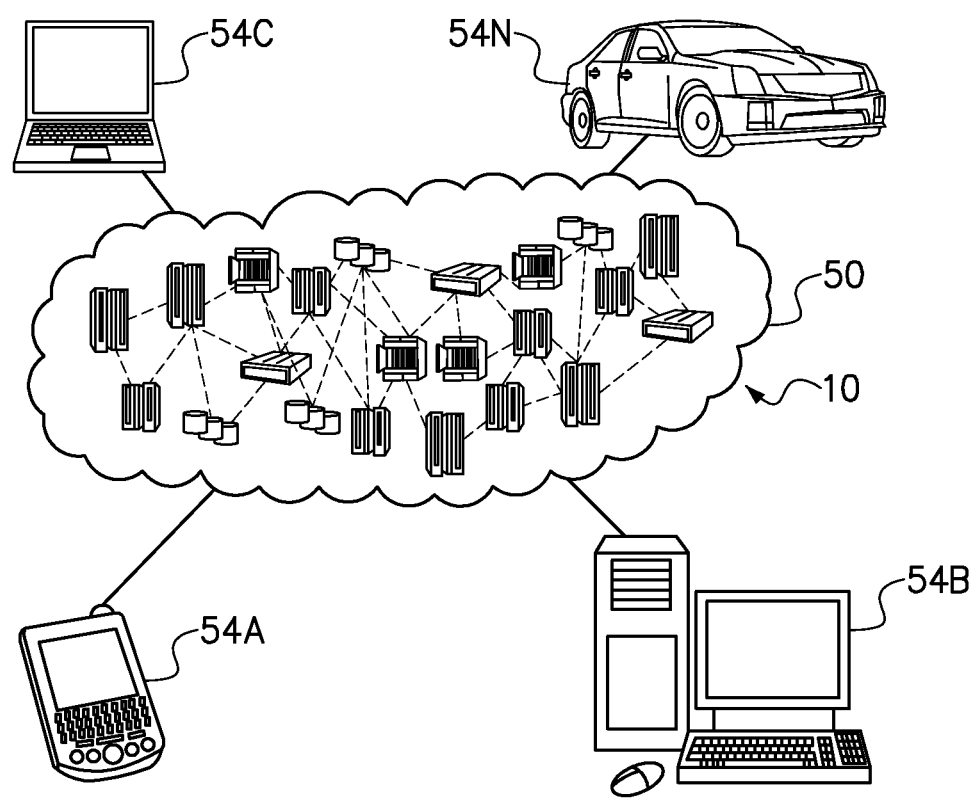
FIG. 2 is a diagram of a cloud computing environment according to one or more embodiment of the present invention.

Referring now to FIG. 2, an illustrative cloud computing environment 50 is depicted. As shown, the cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
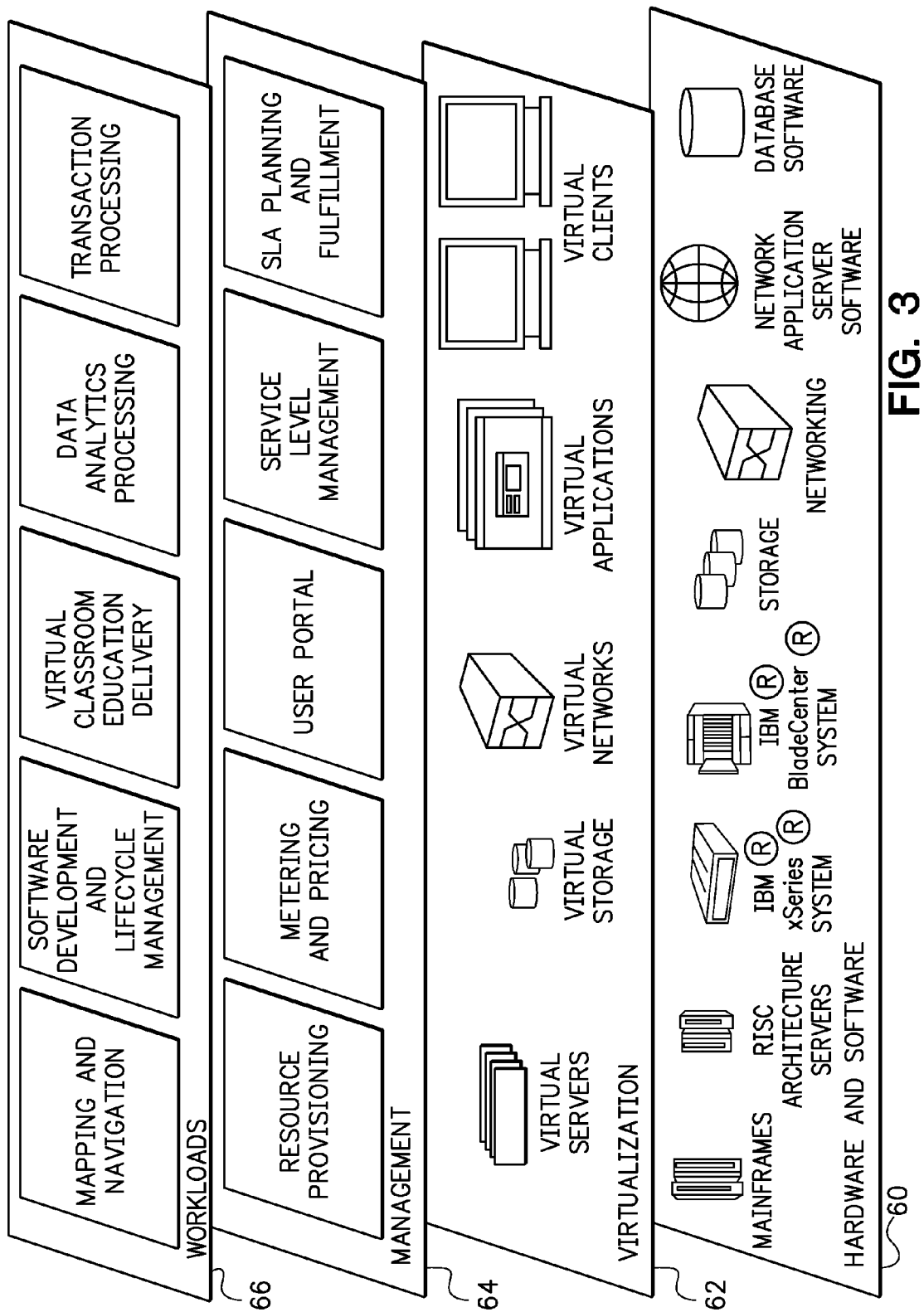
FIG. 3 is a diagram depicting abstraction model layers according to one or more embodiment of the present invention.

Referring now to FIG. 3, a set of functional abstraction layers provided by cloud computing environment 50 (Shown in FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

Figure 4:
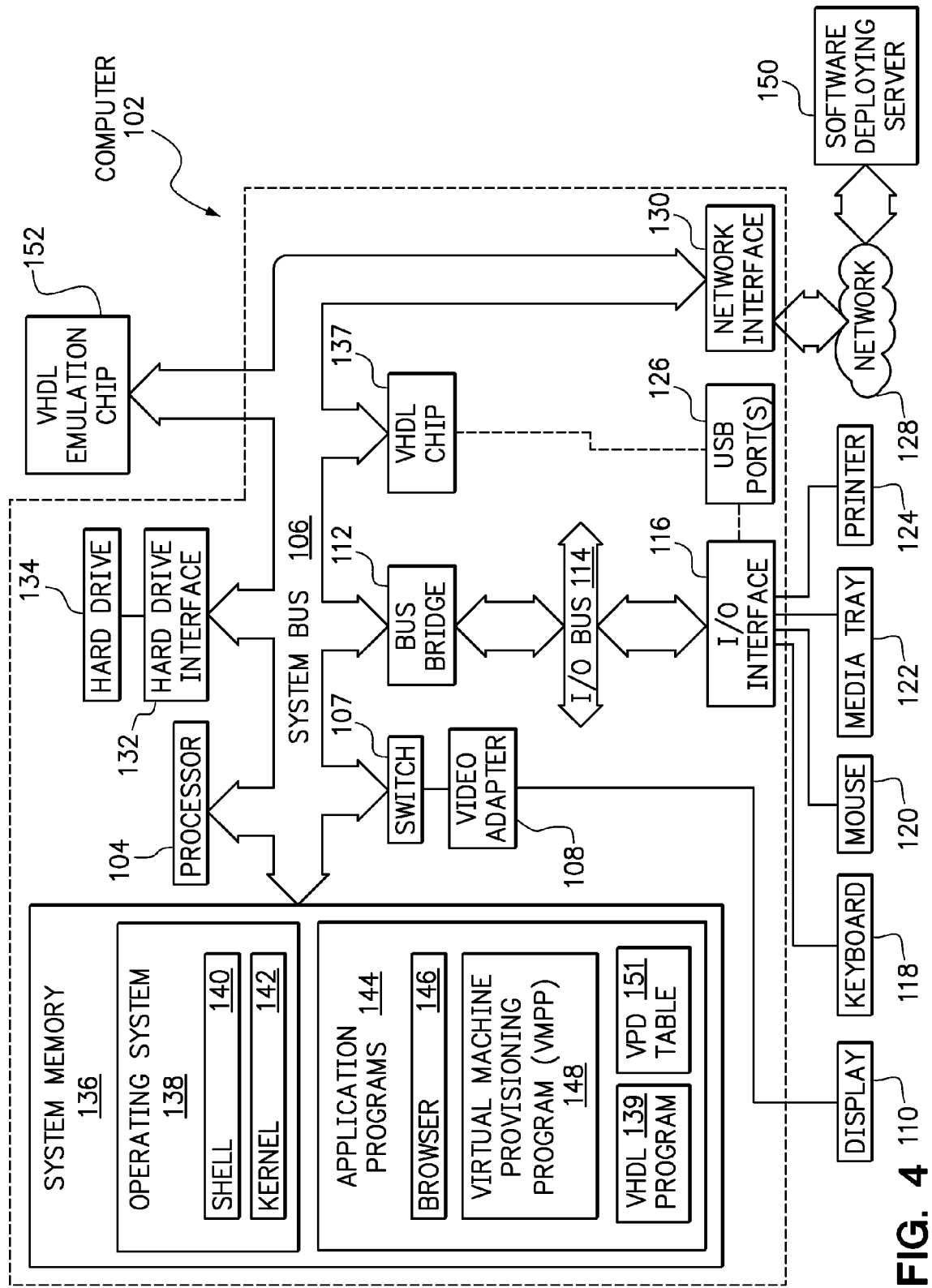
FIG. 4 is a diagram of an exemplary computing node that may be utilized according to one or more embodiments of the present invention.

FIG. 4 depicts an exemplary computing node (or simply "computer") 102 that may be utilized in accordance with one or more embodiments of the present invention. Note that some or all of the exemplary architecture, including both depicted hardware and software, shown for and within computer 102 may be utilized by the software deploying server 150, as well as the provisioning manager/management node 222 and the server blades 204*a-n* shown in FIG. 5. Note that while the server blades described in the present disclosure are described and depicted in exemplary manner as server blades in a blade chassis, some or all of the computers described herein may be stand-alone computers, servers, or other integrated or stand-alone computing devices. Thus, the terms "blade," "server blade," "computer," and "server" are used interchangeably in the present descriptions.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., virtual machine provisioning program—VMPP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, computer 102 is able to communicate with a software deploying server 150 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

The operating system 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in the system memory of computer 102 (as well as the system memory of the software deploying server 150) also include a virtual machine provisioning program (VMPP) 148. VMPP 148 includes code for implementing the processes described below, including those described in FIGS. 2-8. VMPP 148 is able to communicate with a vital product data (VPD) table 151, which provides required VPD data described below. In one embodiment, the computer 102 is able to download VMPP 148 from software deploying server 150, including in an on-demand basis. Note further that, in one embodiment of the present invention, software deploying server 150 performs all of the functions associated with the present invention (including execution of VMPP 148), thus freeing computer 102 from having to use its own internal computing resources to execute VMPP 148.

Also stored in the system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from VMPP 148 causes the VHDL program 139 to configure the VHDL chip 137, which may be an FPGA, ASIC, or the like.

In another embodiment of the present invention, execution of instructions from VMPP 148 results in a utilization of VHDL program 139 to program a VHDL emulation chip 151. VHDL emulation chip 151 may incorporate a similar architecture as described above for VHDL chip 137. Once VMPP 148 and VHDL program 139 program VHDL emulation chip 151, VHDL emulation chip 151 performs, as hardware, some or all functions described by one or more executions of some or all of the instructions found in VMPP 148. That is, the VHDL emulation chip 151 is a hardware emulation of some or all of the software instructions found in VMPP 148. In one embodiment, VHDL emulation chip 151 is a programmable read only memory (PROM) that, once burned in accordance with instructions from VMPP 148 and VHDL program 139, is permanently transformed into a new circuitry that performs the functions needed to perform the processes of the present invention.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

A cloud computing environment allows a user workload to be assigned to a virtual machine (VM) somewhere in the computing cloud. This virtual machine provides the software operating system and physical resources such as processing power and memory to support the user's application workload. The present disclosure describes methods for placing virtual machines among physical servers based on an image content classification or the amount of identical memory pages between two virtual machines.

Figure 5:
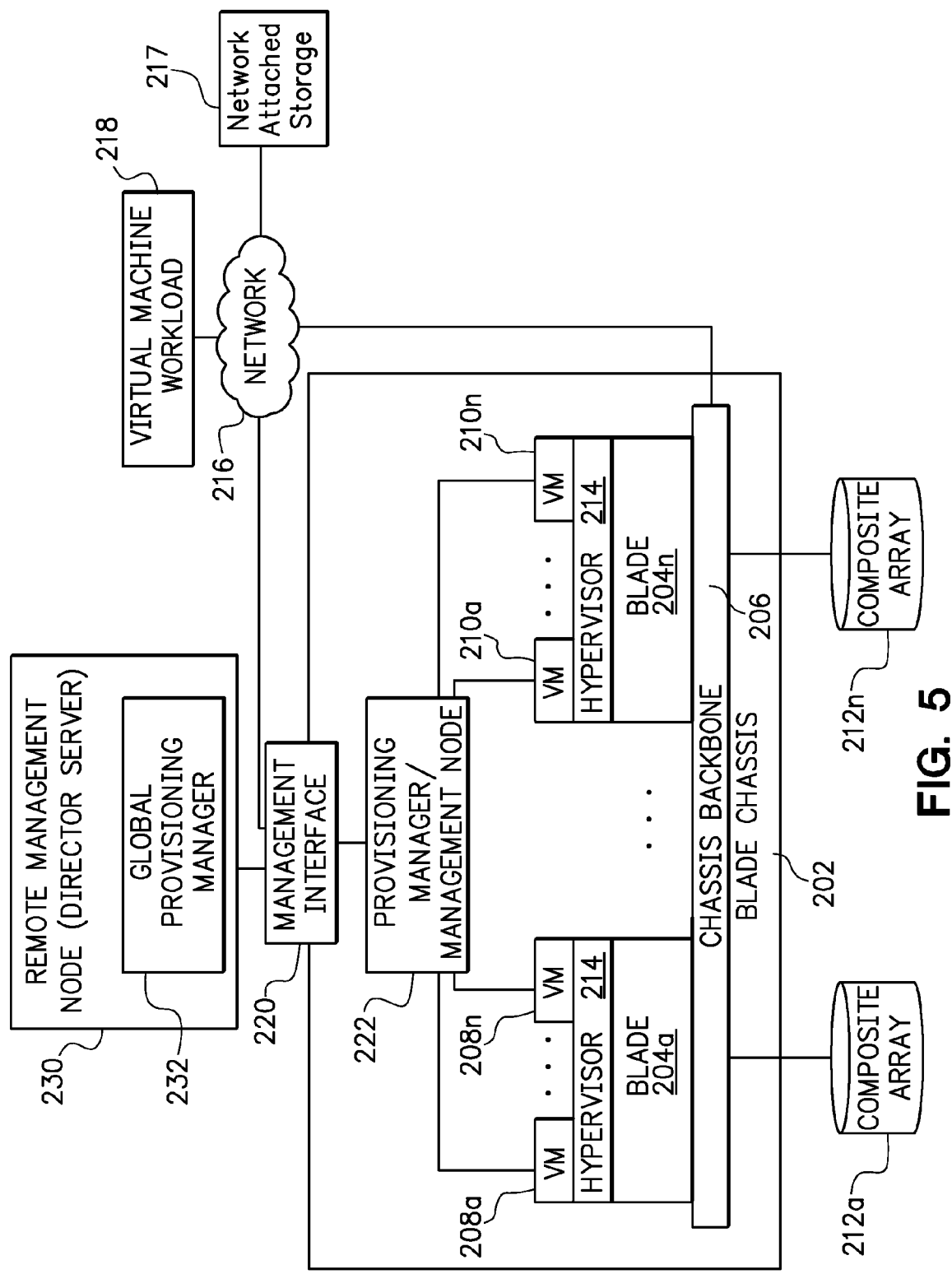
FIG. 5 is a diagram of an exemplary blade chassis that may be utilized according to one or more embodiments of the present invention.

FIG. 5 depicts an exemplary blade chassis that may be utilized in accordance with one or more embodiments of the present invention. The exemplary blade chassis 202 may operate in a "cloud" environment to provide a pool of resources. Blade chassis 202 comprises a plurality of blades 204*a-n* (where "a-n" indicates an integer number of blades) coupled to a chassis backbone 206. Each blade supports one or more virtual machines (VMs). As known to those skilled in the art of computers, a VM is a software implementation (emulation) of a physical computer. A single hardware computer (blade) can support multiple VMs, each running the same, different, or shared operating systems. In one embodiment, each VM can be specifically tailored and reserved for executing software tasks 1) of a particular type (e.g., database management, graphics, word processing etc.); 2) for a particular user, subscriber, client, group or other entity; 3) at a particular time of day or day of week (e.g., at a permitted time of day or schedule); etc.

As depicted in FIG. 5, blade 204a supports VMs 208a-n (where "a-n" indicates an integer number of VMs), and blade 204n supports VMs 210a-n (wherein "a-n" indicates an integer number of VMs). Blades 204a-n are coupled to a storage device 212 that provides a hypervisor 214, guest operating systems, and applications for users (not shown). Provisioning software from the storage device 212 allocates boot storage within the storage device 212 to contain the maximum number of guest operating systems, and associates applications based on the total amount of storage (such as that found within storage device 212) within the cloud. For example, support of one guest operating system and its associated applications may require 1 GByte of physical memory storage within storage device 212 to store the application, and another 1 GByte of memory space within storage device 212 to execute that application. If the total amount of memory storage within a physical server, such as boot storage device 212, is 64 GB, the provisioning software assumes that the physical server can support 32 virtual machines. This application can be located remotely in the network 216 and transmitted from the network attached storage 217 to the storage device 212 over the network. The global provisioning manager 232 running on the remote management node (Director Server) 230 performs this task. In this embodiment, the computer hardware characteristics are communicated from the VPD 151 to the VMPP 148. The VMPP 148 communicates the computer physical characteristics to the blade chassis provisioning manager 222, to the management interface 220, and to the global provisioning manager 232 running on the remote management node (Director Server) 230.

Note that chassis backbone 206 is also coupled to a network 216, which may be a public network (e.g., the Internet), a private network (e.g., a virtual private network or an actual internal hardware network), etc. Network 216 permits a virtual machine workload 218 to be communicated to a management interface 220 of the blade chassis 202. This virtual machine workload 218 is a software task whose execution, on any of the VMs within the blade chassis 202, is to request and coordinate deployment of workload resources with the management interface 220. The management interface 220 then transmits this workload request to a provisioning manager/management node 222, which is hardware and/or software logic capable of configuring VMs within the blade chassis 202 to execute the requested software task. In essence the virtual machine workload 218 manages the overall provisioning of VMs by communicating with the blade chassis management interface 220 and provisioning management node 222. Then this request is further communicated to the VMPP 148 in the computer system. Note that the blade chassis 202 is an exemplary computer environment in which the presently disclosed methods can operate. The scope of the presently disclosed system should not be limited to a blade chassis, however. That is, the presently disclosed methods can also be used in any computer environment that utilizes some type of workload management or resource provisioning, as described herein. Thus, the terms "blade chassis," "computer chassis," and "computer environment" are used interchangeably to describe a computer system that manages multiple computers/blades/servers.

Figure 6:
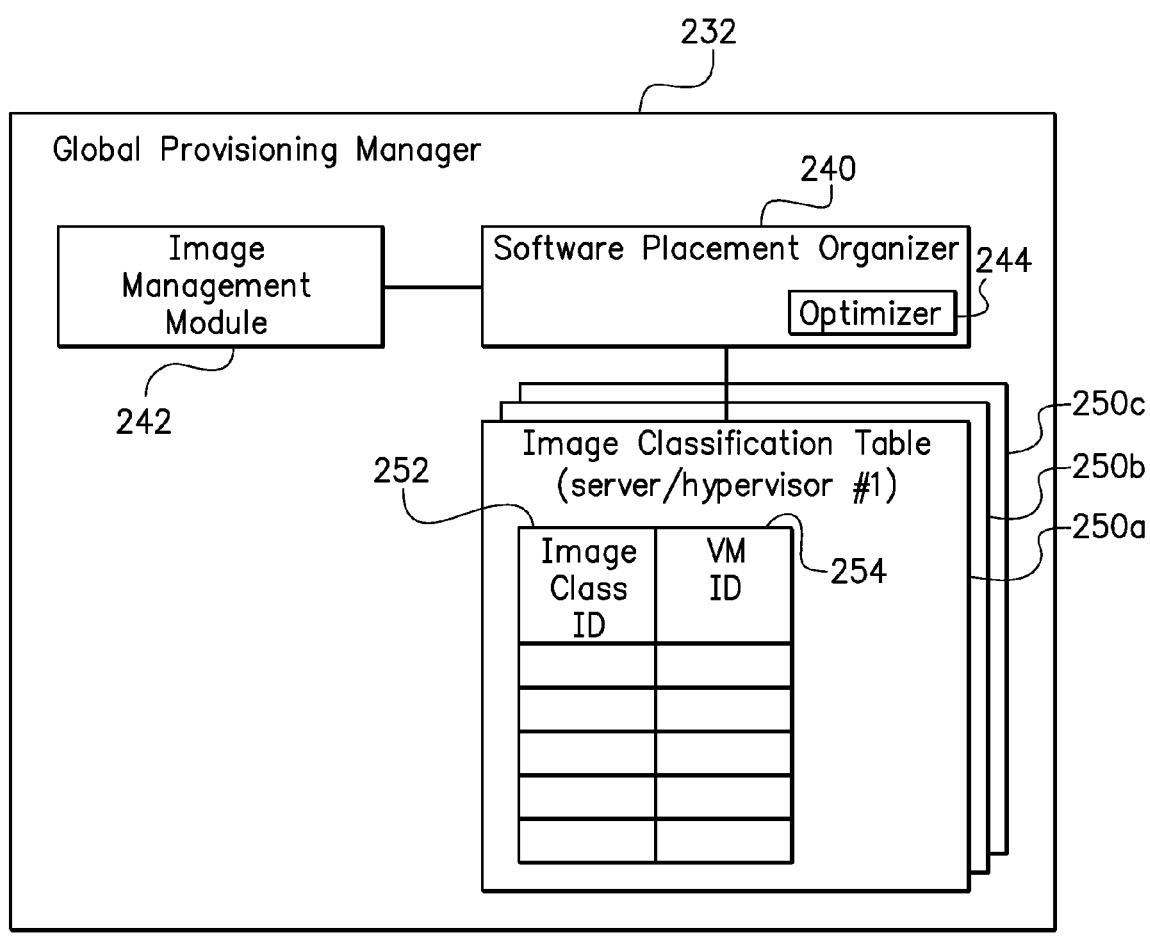
FIG. 6 is a diagram of a global provisioning manager according to one or more embodiments of the present invention.

FIG. 6 is a diagram of the global provisioning manager 232 according to one or more embodiments of the present invention. The global provisioning manager 232 makes more efficient use of the physical memory resource of each server (See blade servers 204a-n in FIG. 5) by implementing a Software Placement Organizer 240. The Software Placement Optimizer creates an Image Classification Table for each hypervisor within the cloud, as illustrated by the three Image Classification Tables 250a-c corresponding to three servers that each have a hypervisor. The Image Classification Tables include an entry for each virtual machine, where each entry may be indexed by an image classification ID (see column 252) and include virtual machine ID (see column 254). Data structures other than a table might also be used.

Image classification could be performed dynamically, or more preferably in association with creating the virtual machine image. For example, as a virtual machine is created, the virtual machine could be classified according to the Golden Master from which the virtual machine was cloned. This classification model fits well into the cloud computing paradigm where all VMs are created from a set of Golden Images within an enterprise wide repository. In an alternative embodiment, the Image Classification Table may provide data regarding the amount of identical memory pages that exist between any two virtual machines.

An Image Management Module 242 then creates and manages all virtual machine images across all of the servers in the migration domain. At virtual machine creation, all VMs are classified, and given an image classification ID by the Image Management Module. In previous systems, virtual machines were randomly allocated to a physical server that had sufficient CPU and memory bandwidth to house this image. However, the Software Placement Organizer 240 running in conjunction with the Image Management Module 242 has awareness of the image classification ID for all of the virtual machines. A Software Placement Optimizer 244 scans the Image Classification Tables for all hypervisors (i.e., Tables 250a-c), then determines an appropriate target server/hypervisor for the newly created virtual machine based on the highest image ID occurrence of the virtual machine, as well as the availability of memory capacity and CPU bandwidth on the servers within the system pool. At initialization, the Software Placement Organizer 240 groups the images based on their image classification ID and records these allocations in a table. Due to the commonality of software across identical virtual machine, more virtual machines can be allocated in the same physical memory space.

Figures 7A, 7B:
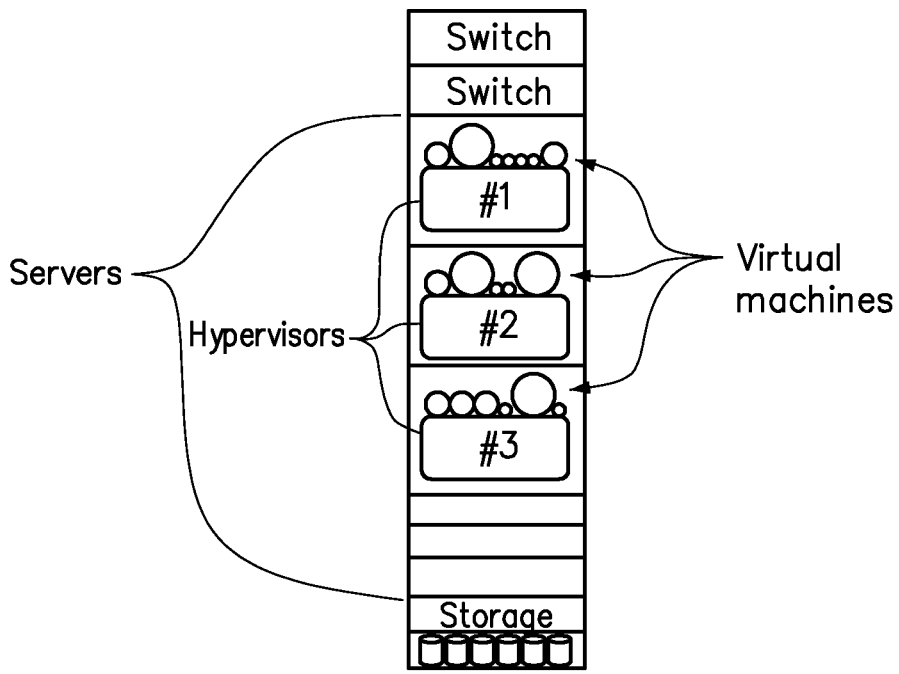
FIGS. 7A and 7B are a diagram and a table, respectively, showing a first placement of virtual machines.

FIGS. 7A and 7B are a diagram and a table, respectively, showing a first placement of virtual machines. In the diagram of FIG. 7A, multiple virtual machines are shown having been placed under each of the hypervisors running on the three physical servers (#1, #2 and #3). The virtual machines are illustrated as circles, wherein the diameter of each circle indicates its image classification ID. Without benefit of the present invention, each physical server has at least one virtual machine with each of three image classification IDs. In the table of FIG. 7B, those same virtual machines are listed in association with the physical server on which it is placed. Although the image classification ID may take many forms, it is illustrated here by the circle diameter and an image size. By multiplying the image size of each class by the number of virtual machines in that class allocated to the particular physical server, the total memory usage may be calculated. Assuming in this example that each physical server has 20 GB of memory, the remaining memory is shown in the last column.

Figures 8A, 8B:
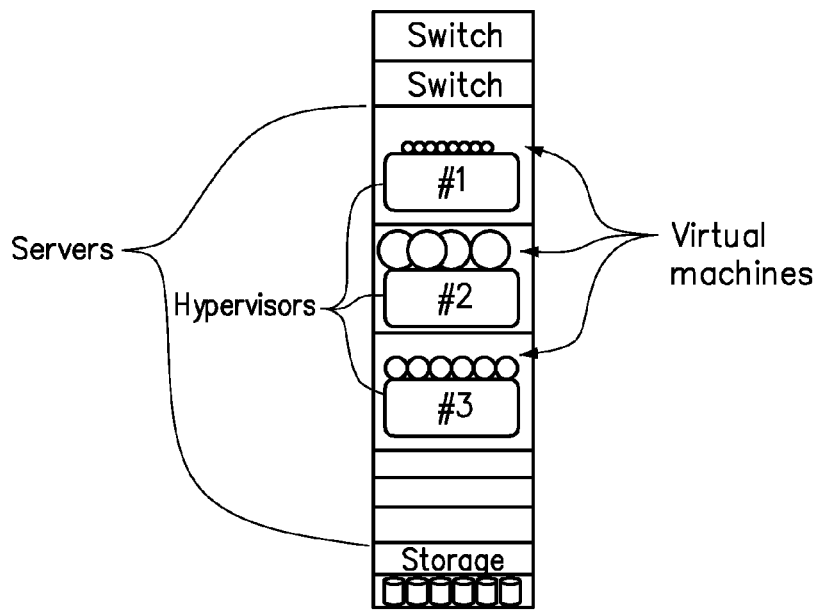
FIGS. 8A and 8B are a diagram and a table, respectively, showing a second, more efficient placement of virtual machines using the same system resources as in FIGS. 7A and 7B.

FIGS. 8A and 8B are a diagram and a table, respectively, showing a second, more efficient placement of virtual machines using the same system resources as in FIGS. 7A and 7B. With the benefit of the methods of the present invention, the same set of virtual machines shown in FIG. 7A are now placed or grouped in FIG. 8A so that virtual machines in the same classification are now running under a common hypervisor. Specifically as shown in FIG. 8A, there are eight (8) virtual machines of the 2 GB class running under the hypervisor on physical server #1, four (4) virtual machines of the 4 GB class running under the hypervisor on physical server #2, and six (6) virtual machines of the 2 GB class running under the hypervisor on physical server #3.

The implementation of FIG. 7A may incorporate and benefit from transparent page sharing even without the use of the present invention. However, the implementation of FIG. 8A in accordance with the placement methods of the present invention will result in more efficient use of the available memory since the virtual machines on a each physical server have the same image classification ID and, therefore, a greater amount of identical memory pages.

8B is a table showing that, as a result of the more efficient placement of virtual machines in FIG. 8A, the same system resources as in FIGS. 7A and 7B may be used to host additional virtual machines. Specifically, assuming the same 20 GB of memory per physical server and assuming a certain marginal reduction in memory used per virtual machine (i.e., a 1 GB memory reduction for each VM in the 4 GB class, a 1.1 GB memory reduction for each VM in the 3 GB class, and a 750 MB memory reduction for each VM in the 2 GB class), it is now possible for (1) physical server #1 to run twelve (12) virtual machines in the 2 GB class with 5 GB memory remaining, (2) physical server #2 to run six (6) virtual machines in the 4 GB class with 2 GB memory remaining, and physical server #3 to run ten (10) virtual machines in the 3 GB class with 1 GB memory remaining. Accordingly, the methods of the present invention may allow twenty-eight (28) virtual machines to run on the same three physical servers that previously ran only eighteen (18) virtual machines.

Figure 9:
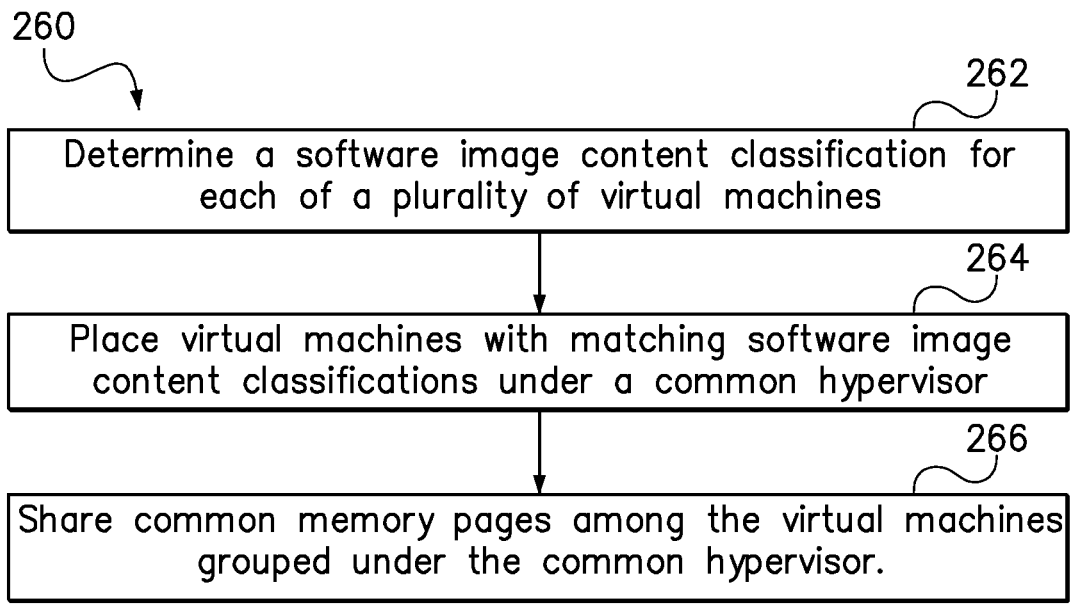
FIG. 9 is a flowchart of a method for placing virtual machines on the basis of software image content classifications.

FIG. 9 is a flowchart of a method 260 for placing virtual machines on the basis of software image content classifications. In step 262, the method determines a software image content classification for each of a plurality of virtual machines. In step 264, the method places virtual machines that have matching software image content classifications under a common hypervisor. In step 266, the method shares common memory pages among the virtual machines that are grouped under the common hypervisor.

Figure 10:
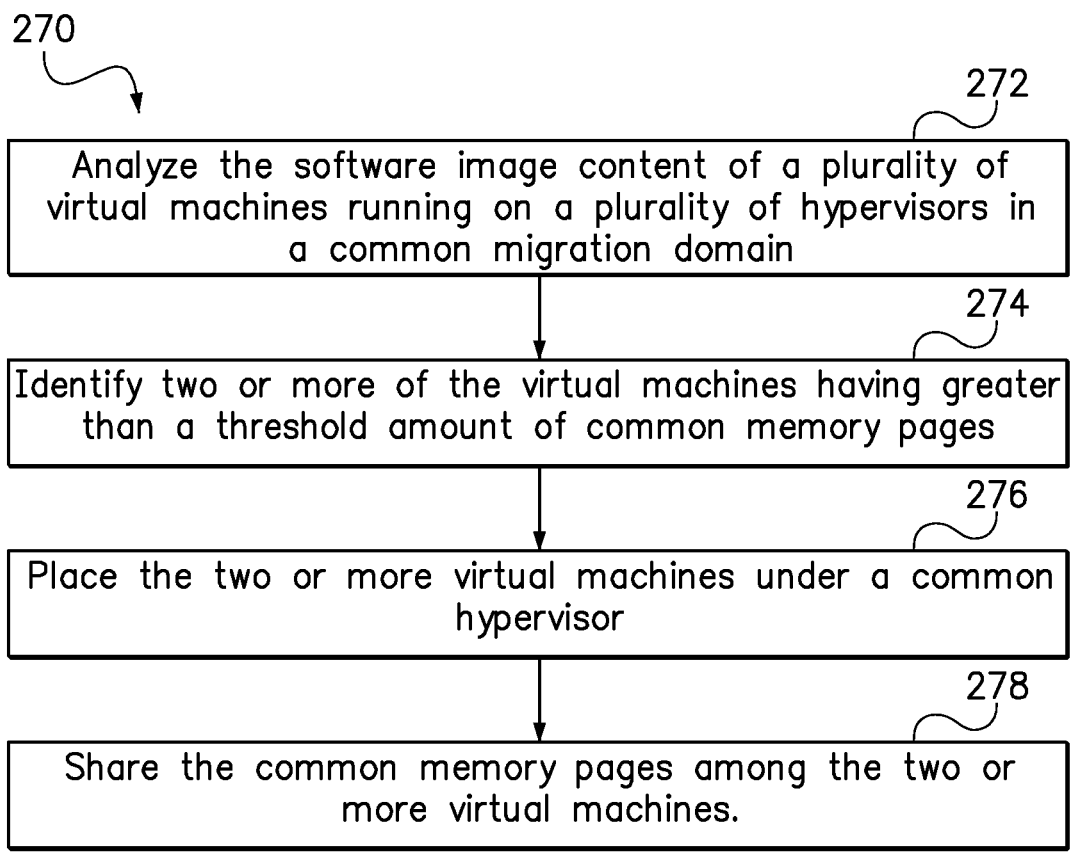
FIG. 10 is a flowchart of a method for placing virtual machines on the basis of the amount of common memory pages between two or more virtual machines.

FIG. 10 is a flowchart of a method 270 for placing virtual machines on the basis of the amount of common memory pages between two or more virtual machines. In step 272, the method analyzes the software image content of a plurality of virtual machines running on a plurality of hypervisors in a common migration domain. In step 274, the method identifies two or more of the virtual machines having greater than a threshold amount of common memory pages. In step 276, the method places the two or more virtual machines under a common hypervisor. In step 278, the method shares the common memory pages among the two or more virtual machines.

Figure 11:
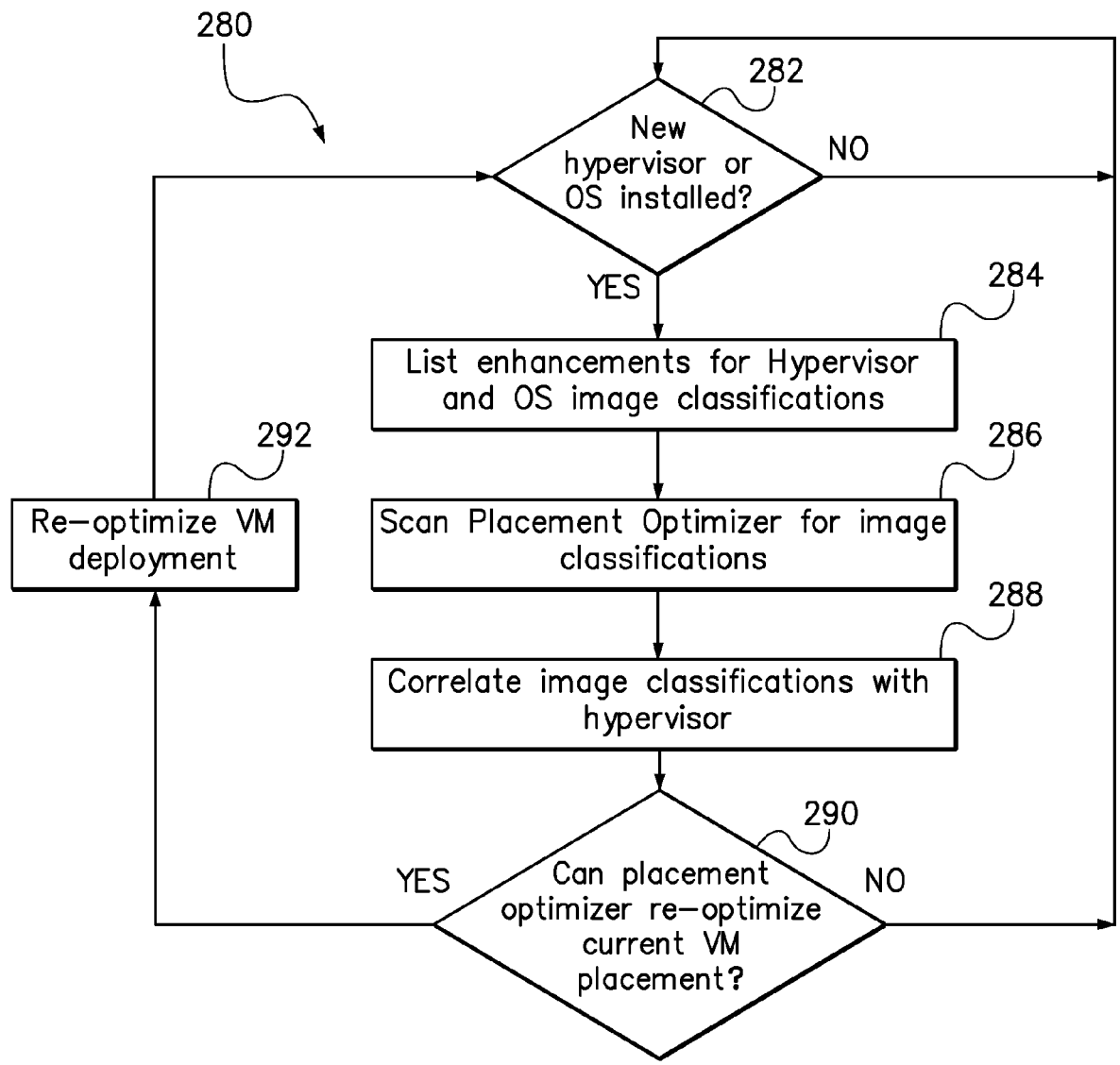
FIG. 11 is a flowchart of a method for optimizing virtual machine placement in response to installation of a new hypervisor or operating system.

FIG. 11 is a flowchart of a method 280 for optimizing virtual machine placement in response to installation of a new hypervisor or operating system. The method begins when step 282 makes a positive determination that there has been an installation of a new hypervisor or a new operating system. Typically, the new hypervisor or new operating system will be a new version of the existing hypervisor software or operating system that provides enhancements and new features. In step 284, enhancements associated with the new hypervisor or new operating system are identified as they relate to certain virtual machines. The Software Placement Optimizer then scans for software image content classifications in step 286, before correlating the software image content classifications with a hypervisor in step 288. If the Software Placement Optimizer is unable to re-optimize the current virtual machine placement, then no further action is taken and the method returns to step 282. However, if the Software Placement Optimizer can re-optimize the current virtual machine placement, then this is performed in step 292 before the method returns to step 282.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, comprising:
    analyzing the software image content of a plurality of virtual machines running on a plurality of hypervisors in a common migration domain;
    identifying two or more of the virtual machines having greater than a threshold amount of common memory pages;
    placing the two or more virtual machines under a common hypervisor;
    increasing the amount of common memory pages between a first virtual machine and a second virtual machine by moving a workload of the first virtual machine from a first operating system to a second operating system that is used by the workload of the second virtual machine; and
    sharing the common memory pages among the two or more virtual machines.

2. The computer-implemented method of claim 1, wherein placing the two or more virtual machines under a common hypervisor, includes dynamically migrating a first of the two or more virtual machines to a physical server running a second of the two or more virtual machines.

3. The computer-implemented method of claim 1, wherein the first and second operating systems are different versions of the same operating system.

4. The computer-implemented method of claim 1, wherein the common memory pages are code pages.

5. The computer-implemented method of claim 4, wherein the code pages are part of an operating system.

6. The computer-implemented method of claim 1, wherein analyzing the software image content of a plurality of virtual machines running on a plurality of hypervisors in a common migration domain, includes determining a software image content classification for each of the plurality of virtual machines.

7. The computer-implemented method of claim 6, wherein identifying two or more of the virtual machines having greater than a threshold amount of common memory pages, includes identifying two or more of the virtual machines having the same software image content classifications.

8. The computer-implemented method of claim 6, wherein determining the software image content classification for each of the plurality of virtual machines, includes classifying a virtual machine based upon a common golden image used to create the virtual machine.

9. The computer-implemented method of claim 8, wherein all virtual machines created from the common golden image have the same operating system.

10. The computer-implemented method of claim 6, further comprising:
   placing additional virtual machines having a given software image content classification onto a server/hypervisor running virtual machines of the same software image content classification.

11. The computer-implemented method of claim 1, further comprising:
   consolidating a standalone workload running on a first physical server to a second physical server running a hypervisor.

12. A computer-implemented method, comprising:
   analyzing the software image content of a plurality of virtual machines running on a plurality of hypervisors in a common migration domain;
   identifying two or more of the virtual machines having greater than a threshold amount of common memory pages;
   placing the two or more virtual machines under a common hypervisor;
   calculating an increased amount of common memory pages that would result from moving a workload of the first virtual machine from a first operating system to a second operating system that is used by a workload of a second virtual machine: and
   sharing the common memory pages among the two or more virtual machines.

13. The computer-implemented method of claim 12, further comprising:
   notifying a user of server utilization benefits of moving the workload to the second operating system.

14. The computer-implemented method of claim 12, further comprising:
   automatically moving the workload to the second operating system in response to the increased amount of common memory pages exceeding a threshold amount.

\* \* \* \* \*